Mar. 3. 1925.
H. B. HEMINGWAY
CREAM SEPARATOR
Filed Sept. 2, 1922
1,528,612
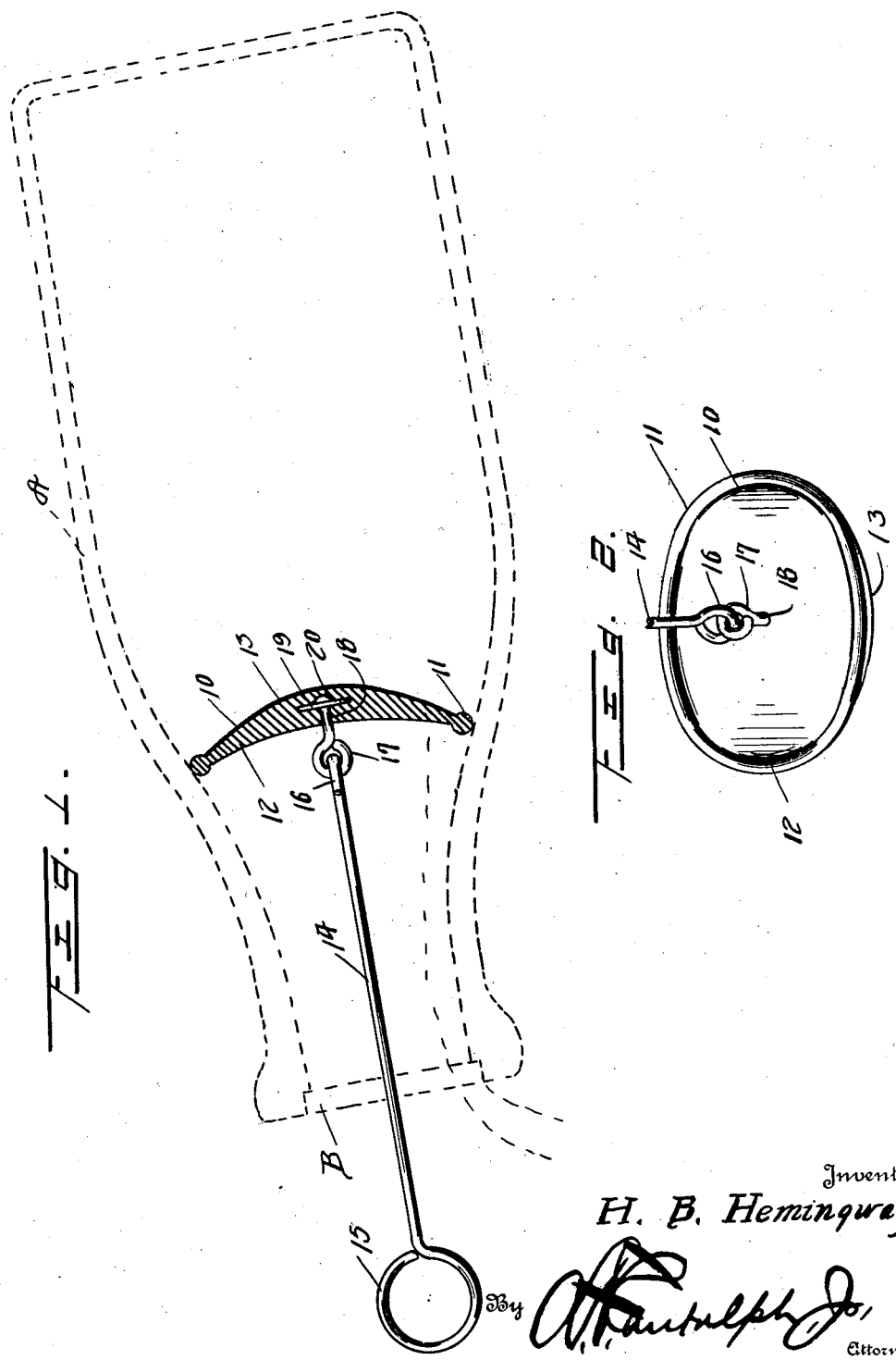
Inventor
H. B. Hemingway Patented Mar. 3, 1925.

1,528,612

UNITED STATES PATENT OFFICE.

HORACE B. HEMINGWAY, OF ALLENTOWN, PENNSYLVANIA, ASSIGNOR OF ONE-TENTH TO GEORGE N. SCHAFFER, OF ALLENTOWN, PENNSYLVANIA.

CREAM SEPARATOR.

Application filed September 2, 1922. Serial No. 586,032.

*To all whom it may concern:*

Be it known that I, HORACE B. HEMINGWAY, a citizen of the United States, residing at Allentown, in the county of Lehigh and State of Pennsylvania, have invented certain new and useful Improvements in a Cream Separator; and I do hereby declare the following to be a full, clear, and exact description of the invention, such as will enable others skilled in the art to which it appertains to make and use the same.

This invention relates to a cream separator.

It is aimed to provide a construction primarily for use in connection with milk bottles or other receptacles in which milk is sold, and which is disposable at the separation line of cream and milk so as to serve as a stopple for the latter and permit the former to be poured off by inverting or tilting the bottle or receptacle.

Another object is to provide a construction in which the disk or stopple will be dished or concavo-convex so that the pressure and weight of the skim milk may expand or tend to flatten the disk in order to better seal the disk at its marginal edge against the inner wall of the bottle to insure better separation of the cream and skim milk and retention of the latter.

It is also aimed to provide a construction in which the disk is located below its pivot or swivel point so as to find the proper level of itself in the bottle.

Still another object is to provide a construction in which the disk or stopple is concavo-convex or dished for the purpose specified, is pliable or expansible and thicker adjacent its center than adjacent the edge to further insure an effective seal at said edge with the bottle assisted by the pressure and weight of the skim milk.

Various additional objects and advantages will become apparent from a consideration of the description following taken in connection with the accompanying drawing illustrating one practical embodiment.

In said drawing:—

Figure 1 is a view illustrating the invention in a milk bottle, with the latter in a pouring position, and the parts being principally in central longitudinal section; and Figure 2 is a detail perspective view of the separator alone.

Like reference characters designate like or similar parts in both views.

A milk bottle or other receptacle is shown at A as representative of the receptacles in which the milk is sold or into which it may be conveniently poured, through the mouth at B. The diameter of the bottle reduces or is constricted toward the mouth B as usual.

With reference to my invention, a disk-like or stopple or round body 10 comprises the separator. This body is of pliable or expansible material, usually being of soft rubber but capable of mechanical construction from other material in order to be expansible. The disk 10 is widest at its center and gradually decreases in thickness toward its marginal edge where a bead 11 may be provided. This separator 10 is concavo convex or dished as shown, having its concaved face 12 uppermost or nearest the mouth of the bottle and its convex surface 13 lowermost or nearest the bottom of the bottle, when in a utile position as shown in Figure 1. The disk 10 at the bead 11 is adapted to directly engage the inner wall of the bottle at the separation line of milk and cream which occurs where the wall of the bottle is constricted and of less diameter than that of Figure 10. As the disk 10 is expansible or pliable, it may be readily contracted or shaped for insertion into the bottle through the mouth thereof.

To facilitate positioning and operation of the disk 10, a bail or metallic rod 14 is provided which is curled into a ring 15 at its upper end and into an eyelet 16 at its lower end. The eyelet 16 is loosely connected through or swiveled to an eyelet 17 which is extended into a shank 18 passed through an anchoring disk or plate 19 embedded in the disk 10 and retained by upsetting the shank 18 as at 20 against the lower surface of the disk 19 so that the eyelet 17 or shank 18 cannot be pulled out of the disk 18 and disk 10. The swivel connection at 16 and 17 is above the disk 10 and thus the latter may be self-positioning.

In use, the bail 14 is engaged and the disk 10 thrust through the mouth of the bottle, its pliability enabling it to contract so as to pass therethrough. The disk 10 through manipulation of bail 14 is positioned at the separation line of the milk and cream within the bottle with the bead 11 intimately engaging the inner wall of the bottle. In such position, the bottle may be partly inverted or tilted as shown in Figure 1 and the cream thus poured off of the same. The disk 10 serves as a stopple for and to prevent pouring of the skim milk which is of course located below it, from the bottle. In addition, the pressure of said skim milk and its weight coacts with the particular dishing or shaping of the disk 10 to cause the same to expand or exert a wedging influence against the bead 11 thus effecting and maintaining a better sealing action thereof against the wall of the bottle. When the bottle is restored to normal position, the expansive pressure on the disk 10 by the skim milk is relieved from the disk 10 and the same may be thereafter removed by extracting movement of the bail 14.

As merely one practical embodiment has been illustrated and described, it is to be understood that changes in the details may be resorted to provided they fall within the spirit and scope of the invention.

Having thus described the invention, what I claim as my invention is:—

1. A cream separator comprising an expansible disk for disposition in a receptacle adjacent the separation line of cream and milk therein, said disk being substantially concavo-convex and having its convex surface innermost for expansion after contact with the receptacle and through pressure of milk against its convex surface to maintain the marginal edge portion of the disk in sealing contact with the inner wall of the receptacle, said disk being thickest adjacent the center and decreasing in width from said center toward the marginal edge, and said disk having a bead at said edge for direct engagement with said inner wall of the receptacle.

2. A cream separator comprising a disk of resilient material for disposition in a receptacle adjacent the separation line of cream and milk therein, said disk being thickest adjacent its center and decreasing in thickness toward its marginal edge, said marginal edge having a bead for direct sealing contact with the inner wall of the receptacle, said disk being substantially concavo-convex and having its convex surface innermost for expansion through pressure of milk against its convex surface to maintain said bead in sealing contact with the inner wall of the receptacle, an eyelet having a shank anchored in said disk, and a manipulating bail swiveled to said eyelet and the point of swiveling of the eyelet and bail being above the disk whereby the latter will be self centering.

In testimony whereof I affix my signature in presence of witnesses.

HORACE B. HEMINGWAY.

Witnesses:
 CHAS. L. WALTERS,
 B. M. DECKERT,
 GEORGE N. SCHAFFER.